United States Patent [19]
Espen

[11] 3,870,940
[45] Mar. 11, 1975

[54] APPARATUS FOR COMPENSATING TWO AXES GIMBAL ERROR

[75] Inventor: David A. Espen, Phoenix, Ariz.

[73] Assignee: Sperry Rand Corporation, New York, N.Y.

[22] Filed: Nov. 18, 1971

[21] Appl. No.: 200,001

[52] U.S. Cl................. 318/633, 318/648, 318/584, 244/77
[51] Int. Cl. ... G05b 11/01, G05d 1/08, B64c 13/18
[58] Field of Search ........... 318/632, 633, 584, 585, 318/648; 244/77

[56] References Cited
UNITED STATES PATENTS

| | | | |
|---|---|---|---|
| 3,078,401 | 2/1963 | Molander, Jr. et al. | 318/632 |
| 3,196,332 | 7/1965 | Branom et al. | 318/633 |
| 3,259,822 | 7/1966 | Burmeister | 318/633 |
| 3,571,687 | 3/1971 | Larwin | 318/632 |
| 3,784,891 | 1/1974 | Burmeister | 318/633 |

Primary Examiner—T. E. Lynch
Attorney, Agent, or Firm—Howard P. Terry; Albert B. Cooper

[57] ABSTRACT

Apparatus for simultaneously compensating pitch and roll gimbal errors in directional gyroscopes for use in navigable craft comprises means responsive to the output signal of the directional gyroscopes and a signal related to the roll attitude of the craft for compensating the gyroscope output signal for roll gimbal error. Further means are included responsive to the roll attitude signal, a pitch attitude signal and a signal related to heading for providing a pitch gimbal error compensation signal. This pitch gimbal error compensation signal is combined with the roll compensated directional gyroscope output signal in a repeater servo loop to provide a signal accurately representative of heading irrespective of the pitch and roll attitude of the directional gyroscope.

7 Claims, 5 Drawing Figures

| PITCH θ \ ROLL φ | ±5° | ±10° | ±20° | ±30° |
|---|---|---|---|---|
| 5° | ±.44° | ±.88° | ±1.82° | ±2.88° |
| 10° | ±.88° | ±1.78° | ±3.68° | ±5.8° |
| 15° | ±1.34° | ±2.62° | ±5.6° | ±8.8° |
| 20° | ±1.82° | ±3.68° | ±6.67° | ±11.8° |

HEADING ERROR VS. ROLL & PITCH
AFTER ROLL CORRECTION 3,870,940

APPARATUS FOR COMPENSATING TWO AXES GIMBAL ERROR

BACKGROUND OF THE INVENTION

1. Field of the Invention

The invention relates to gyroscopic compass systems particularly with regard to the type utilized in aircraft. The invention is directed toward apparatus for compensating the output signal of the directional gyroscope for pitch and roll gimbal errors.

2. Description of the Prior Art

It is common in aircraft compass systems of the type utilizing a directional gyroscope for the indicated heading of the aircraft to be in error when the attitude of the aircraft is other than level. This is caused by the gimbal configuration of the directional gyroscope and it is known as gimbal error. The gimbal error increases as the aircraft attitude varies from level. For example, as the aircraft increases its roll and pitch attitudes, the gimbal error increases to such an extent that, for example, for a roll angle of 30° and a pitch angle of 20°, the gimbal error may be approximately 12°. The phenomenon of gimbal error is well understood and is further described on pages 171-174 of the textbook, "The Gyroscope Applied" by K. I. T. Richardson, published in 1954 by The Philosophical Library, Inc.

Previous attempts to correct for gimbal error in gyrocompass systems have usually involved roll and/or pitch stabilization of the directional gyroscope. These attempts are extremely complex in their mechanization and hence very expensive. Furthermore, they are not universally adaptable to the type of gyroscopic data transmission systems normally utilized.

Other attempts to correct for gimbal error in aircraft gyrocompass systems have involved only compensating for roll gimbal error since roll maneuvers are executed more often than pitch maneuvers in the normal cruise regime of the aircraft. Such prior art roll gimbal error compensation systems are described in such patents as U.S. Pat. No. 3,196,332 "Gyroscopic Data Transmission System and Compensating Means Therefor," by J. M. Branom et al issued July 20, 1965; U.S. Pat. No. 3,234,444 "Gimbal Error Compensating System" by W. W. Burmeister et al., issued Feb. 8, 1966; and U.S. Pat. No. 3,259,822 "Gimbal Error Corrected Gyroscopic Systems" by W. W. Burmeister et al., issued July 5, 1966, all assigned to the assignee of the present invention. Although such compensation systems are applicable to separately correcting either roll or pitch gimbal error, complete gimbal error compensation is not effected thereby when the aircraft departs from level flight simultaneously in both pitch and roll.

In order to simultaneously compensate the directional gyroscope for pitch and roll gimbal errors, it has been contemplated utilizing the basic heading output equation for a directional gyroscope which is given in terms of complicated trigonometric functions of pitch, roll, heading and tilt. Such attempts result in elaborate and critical function generation circuits that are impractical to implement. In the development of the present invention it had been considered to develop a roll compensation term by, for example, the techniques described in the aforementioned patents and to subtract this roll compensation term from the basic equation thereby generating a roll compensated equation. It was found, however, that this roll compensated equation was substantially as impractical to implement as the original basic equation.

It is often desirable in prior art systems to obtain a heading signal from the directional gyroscope that is substantially free from pitch and roll gimbal errors when the craft is executing pitch and roll maneuvers. For example, when it is desirable to utilize second order erection for the system vertical gyroscope in the absence of a complex stabilized platform, it is convenient to utilize a heading term to provide the second order erection signals. In order to avoid verticality errors in such systems, it is necessary that the heading signal, derived conveniently from the directional gyroscope, be free from gimbal errors.

SUMMARY OF THE INVENTION

The present invention provides simple and hence inexpensive apparatus for simultaneously compensating the heading output signal of a directional gyroscope for pitch and roll gimbal errors. The invention comprises means responsive to the output signal of the directional gyroscope and a signal related to the roll attitude thereof for compensating the gyroscope output signal for the gimbal error associated with roll attitude. Further means are included responsive to signals related to the pitch and roll attitudes of the directional gyroscope for providing a pitch gimbal error compensation signal, which when combined with the roll compensated gyroscope output signal, provides a heading signal compensated for roll and pitch gimbal errors.

The roll gimbal error compensation means may comprise apparatus in accordance with said U.S. Pat. Nos. 3,196,332; 3,234,444 or 3,259,822. The pitch gimbal error compensation means comprises circuits instrumented in accordance with an approximation to the more complex gyroscope equation.

DESCRIPTION OF THE PREFERRED EMBODIMENTS

Figure 1:
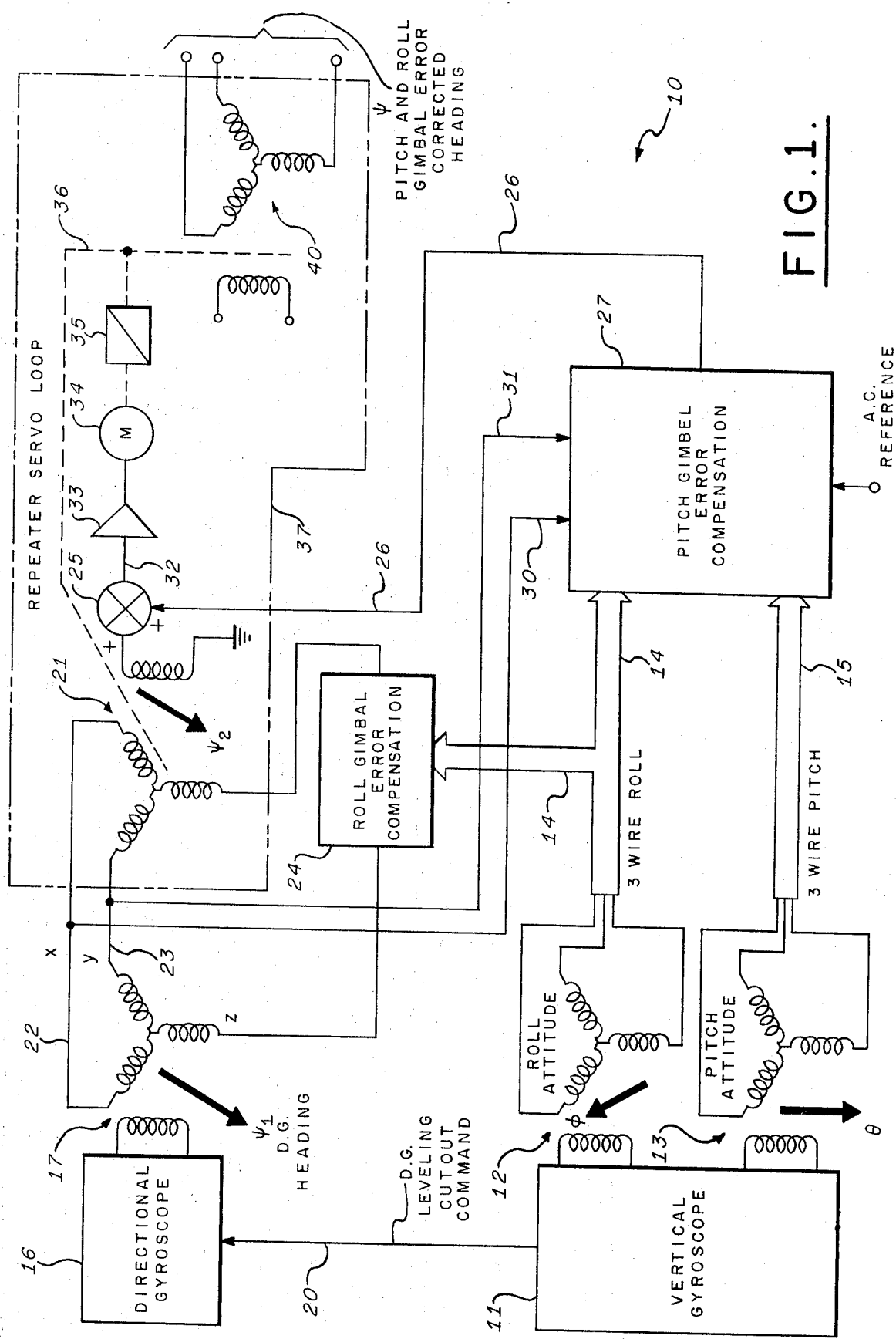
FIG. 1 is a schematic wiring diagram partially in block form of a portion of a gyrocompass system providing a directional gyro heading signal compensated for pitch and roll gimbal error.

Referring to FIG. 1, apparatus 10 for providing a pitch and roll gimbal error compensated heading signal is illustrated. The apparatus 10 includes a vertical gyroscope 11 that provides three-wire roll and pitch attitude signals $\phi$ and $\theta$, respectively, via synchro transmitters 12 and 13 on conductors 14 and 15, respectively, in a conventional manner. The apparatus 10 also includes a directional gyroscope 16 that provides a three-wire heading signal $\psi_1$ via a synchro transmitter 17 in a conventional manner. The directional gyroscope 16 also includes conventional levelling means (not shown) for maintaining the spin axis thereof level with respect to the earth and the vertical gyroscope 11 includes conventional means (not shown) for providing a directional gyro levelling cutout command on a lead 20 for disabling the levelling apparatus during acceleration conditions thereby obviating levelling errors introduced by the acceleration in a conventional manner.

The X and Y windings of the synchro transmitter 17 are connected to the corresponding windings of a synchro control transformer 21 via leads 22 and 23, respectively. The Z winding of the synchro transmitter 17 is connected to the corresponding winding of the control transformer 21 via a roll gimbal error compensation circuit 24. The roll gimbal error compensation circuit 24 is also coupled to receive the three-wire roll attitude signals on the conductors 14 in order to compensate the $\psi_1$ heading signal from the directional gyroscope 16 for roll gimbal error in a manner to be explained. It will be appreciated that the three-wire data at the stator windings of the control transformer 21 is representative of the roll gimbal error compensated heading signal which is converted to two-wire data at the rotor thereof. The rotor of the control transformer 21 provides the signal $\psi_2$ which, in the absence of pitch gimbal error, is representative of the roll corrected heading signal.

The $\psi_2$ signal at the rotor of the control transformer 21 is connected as an input to a summing circuit 25. The other input to the summing circuit 25 is provided on a lead 26 from a pitch gimbal error compensation circuit 27. The pitch gimbal error compensation circuit 27 receives the roll and pitch attitude signals on the conductors 14 and 15, respectively, as well as a signal related to heading from the conductors 22 and 23 via leads 30 and 31, respectively. The circuit 27 provides a pitch gimbal error compensation signal on the lead 26 which is combined with the $\psi_2$ rotor signal from the control transformer 21 in the summing circuit 25 to provide a resultant sum signal on a lead 32. The signal on the lead 32 is applied via a conventional servo amplifier 33 to drive a servo motor 34 and a gear train 35 to position the rotor of the control transformer 21 via a mechanical coupling 36. It will be appreciated that the components 21, 25 and 32–36 comprise a repeater or follow-up servo loop 37 for driving the rotor of the control transformer 21 until the signal on the lead 32 attains a null thereby positioning the mechanical coupling 36 to represent true corrected heading substantially free from roll and pitch gimbal errors in a manner to be explained. A synchro transmitter 40 connected to the coupling 36 provides a three-wire signal $\psi$ representative of pitch and roll gimbal error corrected heading.

In order to facilitate an understanding of the operation of the apparatus of FIG. 1, the following theoretical discussion is provided. The $\psi_1$ signal from the directional gyroscope 16 including pitch and roll gimbal error effects may be expressed as:

$$\psi_1 = \tan^{-1}[(\sin\psi\cos\phi - \cos\psi\sin\theta\sin\phi + \tan T\cos\theta\sin\phi)/(\cos\psi\cos\theta + \tan T\sin\theta)] \quad (1)$$

where:
$\psi_1$ = Heading indicated by gyro 16;
$\psi$ = Actual heading;
$\phi$ = Roll angle;
$\theta$ = Pitch angle;
$T$ = Tilt angle of spin axis with respect to earth.

The spin axis levelling apparatus of the directional gyroscope 16 coupled with the D. G. levelling cutout command on the lead 20 maintains the spin axis of the directional gyroscope substantially level with respect to the earth during both acceleration conditions and non-acceleration conditions such that $\tan T \approx O$. Setting tan T equal to zero in equation (1) yields:

$$\psi_1 = \tan^{-1}[(\sin\psi\cos\phi - \cos\psi\sin\theta\sin\phi)/(\cos\psi\cos\theta)] \quad (2)$$

The roll and pitch gimbal errors in the signal provided by the directional gyroscope 16 are compensated in two steps. The first compensation for roll gimbal error alone is effected by the roll gimbal error compensation circuit 24 in a manner to be described. Accordingly, with the pitch attitude $\theta$ assumed as 0, the circuit 24 changes the three-wire data provided by the synchro transmitter 17 by an amount equal to the angular difference between actual heading $\psi$ and the heading expressed by equation (2) with $\theta = 0$. Thus, the equation for the required angular change may be expressed as:

Roll Gimbal Correction = $\Delta\psi_\phi = [\psi - \psi_1]_\theta = 0$ \quad (3)

and combining equations (2) and (3) yields:

$$\Delta\psi_\phi = -\tan^{-1}(\tan\psi\cos\phi) + \psi \quad (4)$$

Equation (4) expresses the angular change to be applied to the three-wire data from the synchro transmitter 17 to correct for roll gimbal error. This correction is applied even if the pitch angle $\theta$ is not zero. When pitch is not zero, the heading $\psi$ will still be in error after the roll correction.

Combining equations (2) and (4) yields the equation expressing the heading after correction for roll angle alone as follows:

$$\psi_1 + \Delta\psi_\phi = \tan^{-1}[(\sin\psi\cos\phi - \cos\psi\sin\theta\sin\phi)/(\cos\psi\cos\theta)] - \tan^{-1}(\tan\psi\cos\phi) + \psi \quad (5)$$

The difference between equation (5) and the actual heading $\psi$ yields the angular correction to be applied by the second compensation step for the pitch gimbal error. This second correction is implemented in the summation circuit 25 by adding a compensation signal on the lead 26 with the signal provided by the rotor of the control transformer 21 in the repeater servo loop 37. The amount of correction required may be expressed as:

Pitch Gimbal Correction = $\Delta\psi_\theta = \psi - (\psi_1 + \Delta\psi_\phi) = \tan^{-1}(\tan\psi\cos\phi) - \tan^{-1}[(\sin\psi\cos\phi - \cos\psi\sin\theta\sin\phi)/(\cos\psi\cos\theta)]$ \quad (6)

From the foregoing it will be appreciated that the implementation of equations (4) and (6) provides complete compensation for roll and pitch by adding the two corrections $\Delta\psi_\phi$ and $\Delta\psi_\theta$ to the uncompensated directional gyro output $\psi_1$ as follows:

$$\psi_1 + \Delta\psi_\phi + \Delta\psi_\theta = \psi_1 + \Delta\psi_\phi + \psi - (\psi_1 + \Delta\psi_\phi) = \psi \quad (7)$$

The roll gimbal error compensation provided by the circuit 24 is effected by the "Z" leg impedance unbalance method fully developed and described in said U.S. Pat. Nos. 3,196,332; 3,234,444 or 3,259,822. Circuits for instrumenting the roll gimbal error compensation circuit 24 are also disclosed in said patents. Briefly, the circuit 24 comprises a variable impedance that is altered in accordance with the roll attitude signals on the leads 14. The impedance is varied so as to obviate the effect of roll gimbal error in the output from the directional gyroscope 16. Generally, as explained in said patents, when the Z leg of the synchro pair 17, 21 is unbalanced by the insertion of the variable impedance circuit 24, an angular difference is established between the synchro data $\psi_1$ and $\psi_2$ as follows:

$$\tan \psi_2 = \{1 + (2Z_u)/3(Z_1 + Z_2)\} \tan \psi_1 \qquad (8)$$

where, $Z_u$ = the unbalancing impedance introduced between the corresponding Z legs of the transmitting and receiving synchros 17 and 21, respectively;

$Z_1$ = the impedance of one leg of the transmitting synchro 17; and $Z_2$ = the impedance of one leg of the receiving synchro 21.

The Z leg impedance $Z_u$ of the circuit 24 is selected to compensate for roll gimbal error assuming zero pitch angle. Thus with $\psi_1$ representing the output of the directional gyro 16 as expressed by equation (2) above with $\theta = 0$, $Z_u$ is selected such that $\psi_2$ equals the true heading $\psi$ and, $$\tan \psi = \{1 + (2Z_u)/3(Z_1 + Z_2)\} + \tan \psi \cos \phi \qquad (9)$$

or $$Z_u = (3/2)[(1/\cos \phi) - 1](Z_1 + Z_2) \qquad (10)$$

Thus it is appreciated that the impedance $Z_u$ of the circuit 24 is varied as a function of roll attitude as expressed by equation (10) and as instrumented by the circuits disclosed in the aforementioned patents.

Although the roll gimbal error compensation 24 is shown connected between the corresponding Z legs of the synchros 17 and 21, it will be appreciated that conveniently the Z leg of the synchro transmitter 17 may be grounded with the circuit 24 connected between the Z leg of the control transformer 21 and ground as an alternative arrangement.

After correction for roll gimbal error by the variable impedance $Z_u$ of the roll gimbal error compensation circuit 24, the three-wire data from the control transformer 21 has an angle $\psi_2$ given by a combination of the equations (2), (8) and (10) as follows:

$$\psi_2 = \tan^{-1}[(\tan \psi/\cos \theta) - \tan \theta \tan \phi] \qquad (11)$$

As previously mentioned, after correction for roll gimbal error, the pitch gimbal error compensation circuit 27 corrects for differences between $\psi_2$ and the actual heading $\psi$ in accordance with $\Delta \psi_\theta$ as expressed by equation (6). It will be appreciated that instrumentation of equation (6) will result in an exceedingly complex circuit involving a multiplicity of complicated function generators. It is alternatively appreciated that equation (11) may be solved for the true heading $\psi$ in terms of $\psi_2$, $\theta$ and $\phi$, the instrumentation of which would also result in an impractically complex circuit.

Figures 2, 3:
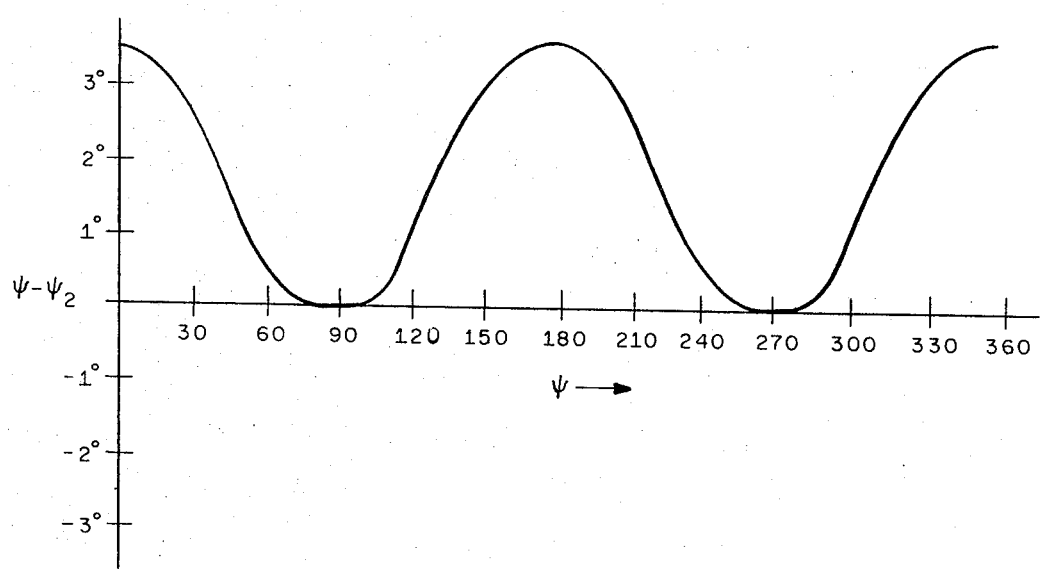
FIG. 2 is a chart showing heading error versus roll and pitch after roll correction useful in deriving the pitch gimbal error compensation circuit.
FIG. 3 is a graph of pitch compensation versus true heading for 20° roll and 10° pitch useful in deriving the pitch gimbal error compensation circuit.

Referring now to FIG. 2, a table of the differences between actual heading $\psi$ and the heading $\psi_2$ after roll gimbal correction at a heading of 0° for various roll and pitch angles is illustrated. The tabulated values are derived from equation (11). Noting the approximate linearity of $\Delta \psi_\theta$ with respect to $\phi$ for each fixed $\theta$ and the approximate linearity of $\Delta \psi_\theta$ with respect to $\theta$ for each fixed $\phi$, it is appreciated that a reasonable approximation within the pitch and roll limits shown in FIG. 2 to the $\Delta \psi_\theta$ equation (6) may be expressed as follows:

$$\text{Pitch Compensation signal} = \Delta \psi_\theta \approx f_{(\psi)} \phi \theta \qquad (12)$$

where $f_{(\psi)}$ is a function of heading to be determined.

To determine $f_{(\psi)}$ as required in the approximation equation (12) the difference between actual heading $\psi$ and $\psi_2$ from equation (11) is graphed as a function of heading $\psi$ for a fixed roll and pitch attitude.

Referring to FIG. 3, such a graph for a roll angle of 20° and a pitch angle of 10° is illustrated. It is clear that since two cycles of the function occupy the range of 0°–360° and the function is at a maximum at 0°, that the required $f_{(\psi)}$ is a function of cos 2 $\psi$. Since the minimum points of the function are on the $\psi$ axis, the required function must be of the form $1 + \cos 2\psi$. Thus it is appreciated that the graph of FIG. 3 may be approximated by a constant plus a two cycle cosine function of heading. Therefore, the approximate pitch compensation signal required is expressible as:

$$\Delta \psi_\theta \approx [(1 + \cos 2 \psi)/111] \theta \phi \text{ degrees} \qquad (13)$$

with $\theta$, $\phi$ in degrees

The factor 1/111 is empirically derived from equation (11) by observing the difference $\psi - \psi_2$ for values of $\psi$, $\theta$, and $\phi$. It is appreciated that equation (13), although an approximation, is readily implemented as a practical circuit.

Figure 4A:
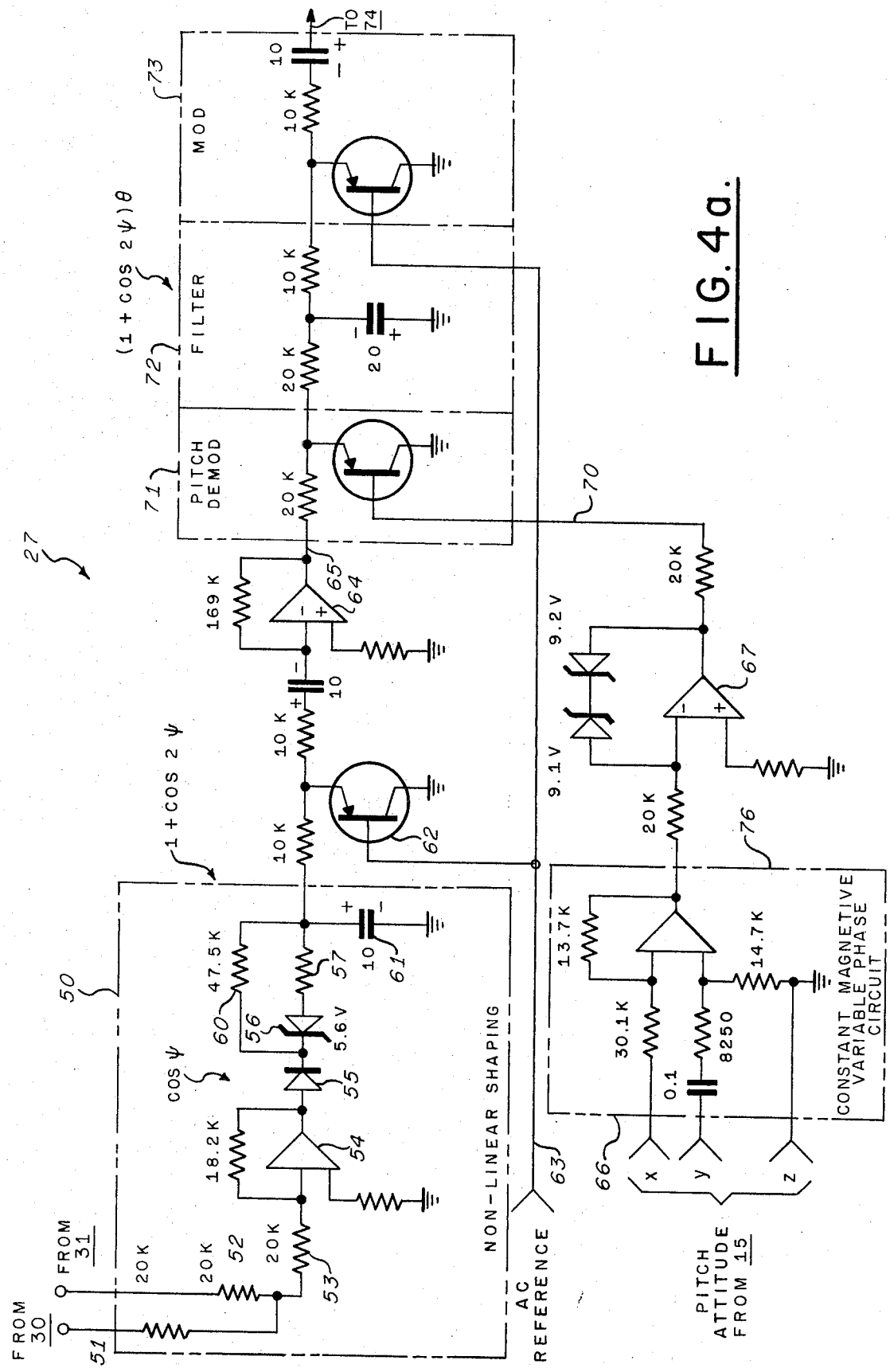
FIGS. 4a and b is a schematic wiring diagram of the pitch gimbal error compensation circuit of FIG. 1.
Figure 4B:
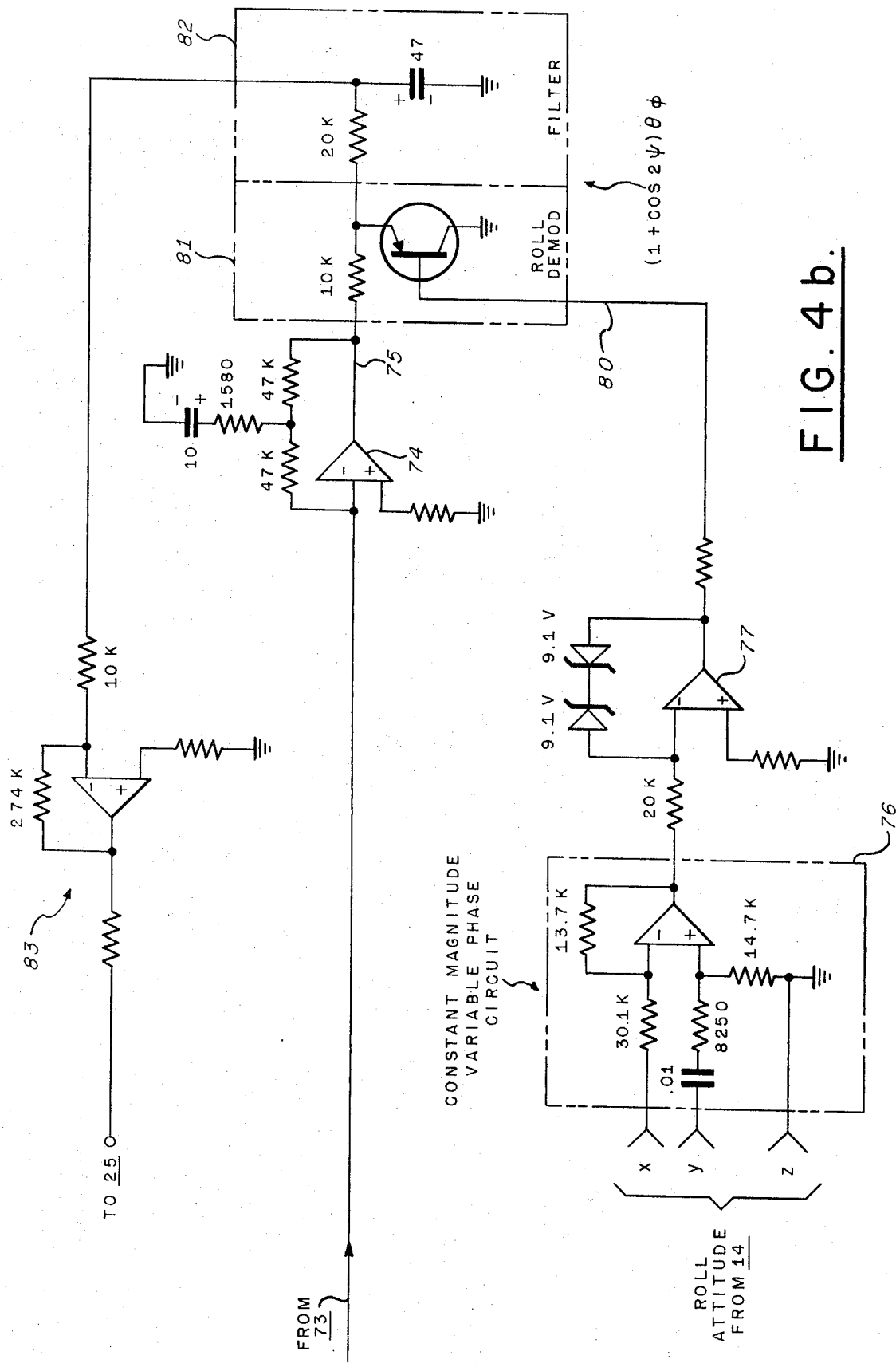

Referring now to FIG. 4, the schematic wiring diagram of a circuit that provides a pitch gimbal compensation signal for roll and pitch angles to 30° and 20°, respectively, providing a heading error of less than 1° throughout this range of pitch and roll attitudes is illustrated. The pitch gimbal error compensation circuit 27 generates the function of heading $(1 + \cos 2\psi)$ from equation (13) in a non-linear shaping network 50. The non-linear shaping network 50 includes resistors 51 and 52 connected to the X and Y legs of the synchro pair 17, 21 by the conductors 30 and 31, respectively. The resistors 51 and 52, together with a resistor 53 and an operational amplifier 54, form a three-wire synchro simulating network to provide a voltage at the output of the operational amplifier 54 that is proportional to the current flowing in the Z leg of the synchro pair 17, 21. Thus the operational amplifier 54 provides an a.c. signal at the synchro carrier frequency whose amplitude is proportional to cos $\psi$. This a.c. signal from the operational amplifier 54 is rectified by a diode 55 providing the positive half-cycles thereof. The diode 55 is connected in series circuit with a zener diode 56 and a resistor 57, the zener diode 56 and the resistor 57 having a resistor 60 in shunt therewith. The junction of the resistors 57 and 60 is connected to ground via a capacitor 61.

In transmitting only the positive half cycles of the synchro carrier signal, the diode 55 effectively provides a full-wave rectified version of the cos $\psi$ amplitude function of the synchro carrier. The non-linear shaping network comprised of the components 56, 57 and 60 function to round the half-wave rectified waveform inflection points on the zero axis and the capacitor 61 functions to average this signal thereby providing a d.c. signal whose magnitude varies as $1 + \cos 2\psi$ in the manner illustrated in FIG. 3.

It will be appreciated that the non-linear shaping circuits 50 are of conventional design well known to practitioners in the art.

The $1 + \cos 2\psi$ signal is applied to the emitter of a transistor 62 whose base electrode is connected to receive an a.c. reference signal on a lead 63 having a frequency equal to that of the synchro carrier. The transistor 62 functions to chop the d.c. signal $1 + \cos 2\psi$. This chopped heading signal is amplified in an amplifier 64 and applied to a lead 65.

The pitch gimbal error compensation circuit 27 also receives the three-wire pitch attitude data on the leads 15. This three-wire pitch data is applied as the input to a constant magnitude-variable phase circuit 66. The structure and operation of the circuit 66 is explained in detail in U.S. patent application Ser. No. 25,004 filed Apr. 2, 1970, "Constant Amplitude-Variable Phase Circuit" by David A. Espen now U.S. Pat. No. 3,617,863 and assigned to the assignee of the present invention. Briefly, the circuit 66 receives as its input the three-wire synchro pitch data representative of a pitch angle and provides a sinusoidal signal of constant magnitude where the phase angle of the signal varies in accordance with the pitch angle. The constant magnitude-variable phase signal from the circuit 66 is hard limited in a limiter 67 to provide a constant magnitude-variable phase square wave on a lead 70 where the phase angle of the square wave signal is proportional to pitch angle and the frequency thereof is equal to the frequency of the a.c. reference on the lead 63.

The chopped heading signal on the lead 65 and the constant magnitude-variable phase square wave on the lead 70 are applied as inputs to a pitch demodulator 71. The output of the pitch demodulator 71 is applied to a low-pass filter 72, the demodulator 71 and the filter 72 functioning as a conventional synchronous demodulator for providing the product of the signals on the leads 65 and 70 in a well known manner. For example, at zero pitch angle, the two signals at the frequency of the synchro carrier are 90° apart resulting in zero volts across the low-pass filter 72 which is equivalent to multiplication by zero. If, however, the pitch angle is not zero, a net d.c. voltage is present at the output of the filter 72 with magnitude proportional to the product signal $(1 + \cos 2\psi)\,\theta$.

The d.c. signal $(1 + \cos 2\psi)\,\theta$ from the filter 72 is applied to a modulator 73 which also receives an input from the a.c. reference signal on the lead 63. The modulator 73 chops the d.c. output from the filter 72 at the frequency of the synchro carrier in the manner previously described with respect to the transistor 62. The chopped signal $(1 + \cos 2\psi)\,\theta$ is amplified in an amplifier 74 and applied to a lead 75.

The pitch gimbal error compensation circuit 27 is also responsive to the three-wire roll data on the leads 14. The roll angle is applied through a constant magnitude-variable phase circuit 76 and a limiter 77 in the manner described with respect to the pitch data to provide a constant magnitude-variable phase square wave on a lead 80 with phase angle proportional to roll angle.

The a.c. signals on the leads 75 and 80 are applied to a roll demodulator 81 and a low-pass filter 82 to provide the product therebetween in synchronous demodulator fashion as previously described with respect to the pitch data. The d.c. signal at the output of the filter 82 therefore may be expressed as $(1 + \cos 2\psi)\,\theta\,\phi$. This signal is applied through an operational amplifier 83 to the summing circuit 25 of FIG. 1. The gain constant 1/111 of equation (13) is determined by the gain of the amplifying circuit 83 and the transfer characteristic of the synchro 21 (FIG. 1).

Referring again to FIG. 1 and FIG. 4, the amplified d.c. output from the low-pass filter 82 is summed in the summing circuit 25 with the rotor signal from the control transformer rotor 21. The servo amplifier 33 nulls the sum of the pitch compensation signal on the lead 26 and the rotor signal with the result that the repeater servo loop 37 indicates pitch and roll gimbal corrected true directional gyro-Reading $\psi$ as desired.

It is of interest to note that the d.c. signal from the filter 82 may be summed with the a.c. signal from the rotor of the control transformer 21 with the servo amplifier 33 responding to both types of signals. This is a characteristic of a conventional amplifier with a quadrature rejection demodulator and d.c. coupling. Alternative configurations may require that the d.c. output from the pitch gimbal error compensation circuit 27 be chopped to a.c. before summing in the servo amplifier 33.

The heading angle $\psi$ indicated in the legends of FIG. 4 and specified in equation (13) has been defined hereinabove as true heading. It will be appreciated that the heading signals utilized in the pitch gimbal error compensation circuit 27 of FIG. 4 are derived from the X and Y windings of the synchro pair 17, 21. This signal is related to $\psi_1$ or the uncorrected output from the directional gyroscope 16. It will thus be appreciated that the pitch gimbal error compensation circuit 27 introduces an approximation to the true compensation in addition to the approximation represented by equation (13). Notwithstanding these approximations, the aforedescribed embodiment of the invention provides a heading error of less than 1° for pitch and roll angles to 20° and 30°, respectively. It is appreciated that should a separate source of heading signal be available, this signal may be utilized in instrumenting the equation (13) to the same effect.

In summary, the uncompensated three-wire heading signal from the directional gyroscope 16 including angular errors caused by gimbal misalignment is repeated by the servo loop 37. The servo loop 37 follows the directional gyroscope output exactly when pitch and roll angles are zero. When the attitude of the directional gyroscope 16 is such that gimbal error is present, the output of the servo 37 does not follow the directional gyroscope output exactly but is corrected to remove the angular error. A synchro transmitter 40 on the servo loop indicates the directional gyro heading $\psi$ corrected for gimbal error.

The gimbal errors in the three-wire data are removed in two steps: Firstly, a correction is applied to remove the angular error due to roll attitude only assuming a zero pitch attitude. This correction is applied by the roll gimbal error compensation circuit 24 utilizing the conventional Z leg unbalance technique described above. Subsequent to the roll correction, the three-wire data is transmitted through the servo control transformer 21 wherein it is converted to two-wire data.

The correction for pitch attitude is applied to the two-wire rotor signal from the control transformer 21 by summing it with a compensation signal from the pitch gimbal error compensation circuit 27. This compensation signal corrects for any remaining error due to pitch attitude. The pitch gimbal error compensation circuit 27 provides a d.c. output voltage on the lead 26 which alters the heading indication from the servo loop 37 in accordance with the function of equation (13).

When the pitch attitude is zero, the correction signal from the pitch gimbal error compensation circuit 27 is zero and the servo 37 repeats the roll corrected data by positioning the rotor of the control transformer 21 for a null in rotor voltage. When both the roll and pitch attitudes are other than zero, the rotor of the control transformer 21 is positioned to null the sum of the control transformer rotor voltage and the pitch compensation signal on the lead 26. The mechanical position of the servo loop 37 then represents true corrected heading. The synchro 40 mounted on the loop 37 then provides the true heading signal $\psi$.

While the above described preferred embodiment of the invention was explained in terms of utilizing the Z leg unbalance method for roll correction and utilizing the servo loop 37 for pitch correction, a converse arrangement may be utilized in practicing the invention.

Referring again to FIG. 2, it was explained above that the table illustrated therein contains functional values that approximate a multiplicative relationship between $\theta$ and $\phi$. A similar table conveniently normalized to integral values to illustrate the multiplicative relationship may be constructed as follows:

$$Z = \begin{array}{c|cccc} Y\backslash X & 1 & 2 & 4 & 6 \\ \hline 1 & 1 & 2 & 4 & 6 \\ 2 & 2 & 4 & 8 & 12 \\ 3 & 3 & 6 & 12 & 18 \\ 4 & 4 & 8 & 16 & 24 \end{array} \quad Z = XY$$

It is appreciated that the values in table (14) are selected with respect to each other such that Z is an exact multiplicative function of X and Y. For example, when X is 4 and Y is 3, Z is 12 as indicated by the table.

It is furthermore appreciated that the table of FIG. 2 is only an approximation to the precise multiplicative table of equation (14). Because this is true, it is believed that the equations (12) and (13) may not be unique. It is believed that alternative approximations may be had by utilizing not only the product of pitch angle and roll angle alone, but the product of the sines of pitch and roll, the tangents of pitch and roll and the like, or combinations thereof.

Although the invention has been described in terms of three-wire data and in terms of introducing the compensation signals by means of the repeater servo loop 37, it is appreciated that other types of data may be utilized in instrumenting the invention and other embodiments not including a repeater servo loop, but instrumenting the approximations described above, may be utilized within the scope of the invention. It is furthermore appreciated that the invention may find particular utility in heading systems that include a repeater servo loop for some other purpose. In such a system, the invention may be practiced by inserting the summation circuit 25 into the existing loop.

The invention was explained in terms of utilizing attitude signals from a vertical gyroscope. It is appreciated that other attitude signal sources may be utilized to the same effect.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. In a gyroscopic data transmission system including a directional gyroscope having a transmitter connected thereto and a receiver electrically coupled to said transmitter by a multicircuit line and wherein said transmitter and receiver have multiple branches each coupled to a respective branch of said multicircuit line, apparatus for compensating the heading signal of said directional gyroscope for gimbal errors with respect to roll and pitch axes thereby providing a totally compensated heading output signal substantially absent said roll and pitch gimbal errors comprising means for providing pitch and roll signals representative of the pitch and roll attitudes of said gyroscope respectively, means coupled in only one branch of said multicircuit line and responsive to only one of said pitch and roll signals for compensating said heading signal only for said gimbal error corresponding to said one signal thereby providing a single axis compensated heading signal at said receiver, the remaining branches of said multicircuit line directly connecting the associated respective branches of said transmitter to the corresponding branches of said receiver, compensation means responsive to said heading signal of said gyroscope and to said pitch and roll signals for providing a compensation signal in accordance with the product of a function of heading, a function of said pitch attitude and a function of said roll attitude, and means coupled to the output of said receiver and to said compensation means for combining said compensation signal with said single axis compensated heading signal to provide said totally compensated heading output signal.

2. In a gyroscopic data transmission system including a directional gyroscope having a transmitter connected thereto and a receiver electrically coupled to said transmitter by a multicircuit line and wherein said transmitter and receiver have multiple branches each coupled to a respective branch of said multicircuit line, apparatus for compensating the heading signal of said directional gyroscope for gimbal errors with respect to roll and pitch axes thereby providing a totally compensated heading output signal substantially absent said roll and pitch gimbal errors comprising attitude means for providing pitch and roll signals representative of the pitch and roll attitudes of said gyroscope respectively, roll compensation means coupled in only one branch of said multicircuit line and responsive to only said roll signal for compensating said heading signal only for said roll gimbal error thereby providing a roll compensated heading signal at said receiver, the remaining branches of said multicircuit line directly connecting the associated respective branches of said transmitter to the corresponding branches of said receiver, pitch compensation means responsive to said heading signal of said gyroscope and to said pitch and roll signals for providing a pitch compensation signal in accordance with the product of a function of heading, a function of said pitch attitude and a function of said roll attitude, and combining means coupled to the output of said receiver and to said pitch compensation means for combining said pitch compensation signal with said roll compensated heading signal to provide said totally compensated heading signal.

3. The apparatus of claim 2 in which said pitch compensation means comprises means for providing said pitch compensation signal in accordance with pitch compensation signal = $f_{(\psi)}\,\theta\,\phi$
where $f_{(\psi)}$ = said function of heading,
$\theta$ = said pitch attitude,
$\phi$ = said roll attitude.

4. The apparatus of claim 2 in which said pitch compensation means comprises means for providing said pitch compensation signal in accordance with pitch compensation signal = $K\,(1+\cos 2\psi)\,\theta\,\phi$
where
$\psi$ = heading
$\theta$ = said pitch attitude
$\phi$ = said roll attitude $K$ = constant.

5. The apparatus of claim 2 in which said attitude means comprises vertical gyroscope means.

6. The apparatus of claim 2 in which said combining means comprises servo loop means nulled in accordance with the sum of said roll compensated heading signal and said pitch compensation signal.

7. The apparatus of claim 2 in which said roll compensation means comprises variable impedance means connected between said transmitter and said receiver in said one branch of said multicircuit line.

* * * * *